(12) United States Patent
Crawford et al.

(10) Patent No.: US 9,986,506 B2
(45) Date of Patent: May 29, 2018

(54) GLOBAL POSITIONING SYSTEM (GPS) SIGNAL PIGGYBACK IN A DISTRIBUTED DEVICE ENVIRONMENT

(71) Applicant: International Business Machines Corporation, Armonk, NY (US)

(72) Inventors: Catherine H. Crawford, Carmel, NY (US); Shahrokh Daijavad, Morgan Hill, CA (US); Nirmit V. Desai, Yorktown Heights, NY (US); Scott D. Lekuch, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 14/972,900

(22) Filed: Dec. 17, 2015

(65) Prior Publication Data
US 2017/0181085 A1   Jun. 22, 2017

(51) Int. Cl.
*H04W 4/02*   (2018.01)
*H04W 52/02*  (2009.01)
*H04W 4/00*   (2018.01)

(52) U.S. Cl.
CPC ....... *H04W 52/0229* (2013.01); *H04W 4/003* (2013.01); *H04W 4/008* (2013.01); *H04W 4/023* (2013.01); *Y02B 60/50* (2013.01)

(58) Field of Classification Search
CPC .......... G06Q 30/0261; G06Q 30/0267; G06Q 30/0613; H04W 4/021; H04W 4/06;
(Continued)

(56) References Cited

U.S. PATENT DOCUMENTS 8,583,169 B2   11/2013   Walley et al.
2002/0055362 A1*   5/2002   Aoyama ............... G01S 5/0072
                                                      455/456.6
(Continued)

FOREIGN PATENT DOCUMENTS

WO   03101139 A1   12/2003

OTHER PUBLICATIONS

Papadopouli, M. et al., "Effects of Power Conservation, Wireless Coverage and Cooperation on Data Dissemination Among Mobile Devices", In Proc. of 2nd ACM Int'l Sym. on Mobile Ad Hoc Networkign & Computing, pp. 117-127, Oct. 1, 2001, ACM.

*Primary Examiner* — Quan M Hua
(74) *Attorney, Agent, or Firm* — Cuenot, Forsythe & Kim, LLC

(57) ABSTRACT

An application configured to provide a service using a particular type of sensor data can be executed by a first mobile device. The application attempting to access the particular type of sensor data from the first mobile device can be detected. Responsive to detecting the application attempting to access the particular type of sensor data from the first mobile device, the first mobile device can receive first sensor data from at least a second mobile device via at least a first low energy communication link, wherein the first sensor data received from the second mobile device is the particular type of sensor data the application is attempting to access, and the first mobile device can execute program code configured to provide the particular type of sensor data, and providing the first sensor data received from the second mobile device to the application.

15 Claims, 3 Drawing Sheets

(58) Field of Classification Search
CPC ... H04W 76/023; H04W 84/18; H04W 4/008; H04W 4/04; H04W 4/22; H04B 17/27; H04B 5/0062; H04N 1/00278; H04N 1/00307; H04N 2201/0065; H04N 2201/0072

See application file for complete search history.

(56) References Cited

U.S. PATENT DOCUMENTS

| | | | |
|---|---|---|---|
| 2009/0079622 A1 | 3/2009 | Seshadri et al. | |
| 2010/0302095 A1 | 12/2010 | Yu | |
| 2011/0040858 A1 | 2/2011 | Gum | |
| 2011/0143779 A1* | 6/2011 | Rowe | G06Q 30/02 455/456.3 |
| 2012/0053889 A1* | 3/2012 | Sambongi | G03F 7/70775 702/150 |
| 2012/0176976 A1 | 7/2012 | Wells | |
| 2013/0340033 A1* | 12/2013 | Jones | H04W 12/08 726/1 |
| 2015/0317682 A1* | 11/2015 | Kayser | G01G 19/4144 705/14.55 |
| 2016/0061957 A1* | 3/2016 | Li | G01S 5/0263 342/357.42 |
| 2016/0323708 A1* | 11/2016 | Sahadi | H04W 4/023 |

\* cited by examiner

200

---

Execute, by a first mobile device, an application configured to provide a service using a particular type of sensor data
205

---

Detect the application attempting to access the particular type of sensor data from the first mobile device
210

---

Responsive to detecting the application attempting to access the particular type of sensor data from the first mobile device, receive, by the first mobile device, first sensor data from at least a second mobile device via at least a first low energy communication link, wherein the first sensor data received from the second mobile device is the particular type of sensor data the application is attempting to access and execute, by the first mobile device, program code configured to provide the particular type of sensor data, and providing the first sensor data received from the second mobile device to the application
215

FIG. 2

GLOBAL POSITIONING SYSTEM (GPS) SIGNAL PIGGYBACK IN A DISTRIBUTED DEVICE ENVIRONMENT

BACKGROUND

The present invention relates to mobile devices, and more specifically, to use of sensor data to provide a service.

As the number and variety of commercially available mobile devices continues to increase, new applications continue to be developed to provide different types of location based services. Location based services are a class of computer program-level services that use location data, for example global positioning system (GPS) data, to control features that are provided to mobile devices. Such features typically are used to enhance user experiences when using mobile devices. For example, GPS location data can be used to enhance social networking interactions among users based on user locations, help users find goods and services being offered in particular geographic areas, provide maps and directions, etc.

SUMMARY

A method includes executing, by a first mobile device, an application configured to provide a service using a particular type of sensor data. The method also can include detecting the application attempting to access the particular type of sensor data from the first mobile device. The method also can include, responsive to detecting the application attempting to access the particular type of sensor data from the first mobile device, receiving, by the first mobile device, first sensor data from at least a second mobile device via at least a first low energy communication link, wherein the first sensor data received from the second mobile device is the particular type of sensor data the application is attempting to access, and executing, by the first mobile device, program code configured to provide the particular type of sensor data, and providing the first sensor data received from the second mobile device to the application.

A first mobile device includes a processor programmed to initiate executable operations. The executable operations include executing, by the first mobile device, an application configured to provide a service using a particular type of sensor data. The executable operations also can include detecting the application attempting to access the particular type of sensor data from the first mobile device. The executable operations also can include, responsive to detecting the application attempting to access the particular type of sensor data from the first mobile device, receiving, by the first mobile device, first sensor data from at least a second mobile device via at least a first low energy communication link, wherein the first sensor data received from the second mobile device is the particular type of sensor data the application is attempting to access, and executing, by the first mobile device, program code configured to provide the particular type of sensor data, and providing the first sensor data received from the second mobile device to the application.

A computer program includes a computer readable storage medium having program code stored thereon. The program code is executable by a processor to perform a method. The method includes executing, by a first mobile device using the processor, an application configured to provide a service using a particular type of sensor data. The method also can include detecting, by the first mobile device using the processor, the application attempting to access the particular type of sensor data from the first mobile device. The method also can include, responsive to detecting the application attempting to access the particular type of sensor data from the first mobile device, receiving, by the first mobile device using the processor, first sensor data from at least a second mobile device via at least a first low energy communication link, wherein the first sensor data received from the second mobile device is the particular type of sensor data the application is attempting to access, and executing, by the first mobile device using the processor, program code configured to provide the particular type of sensor data, and providing the first sensor data received from the second mobile device to the application.

BRIEF DESCRIPTION OF THE DRAWINGS

FIG. 2 is a flow chart illustrating an example of a method of first mobile device using sensor data received from a second mobile device.

DETAILED DESCRIPTION

Figure 1:
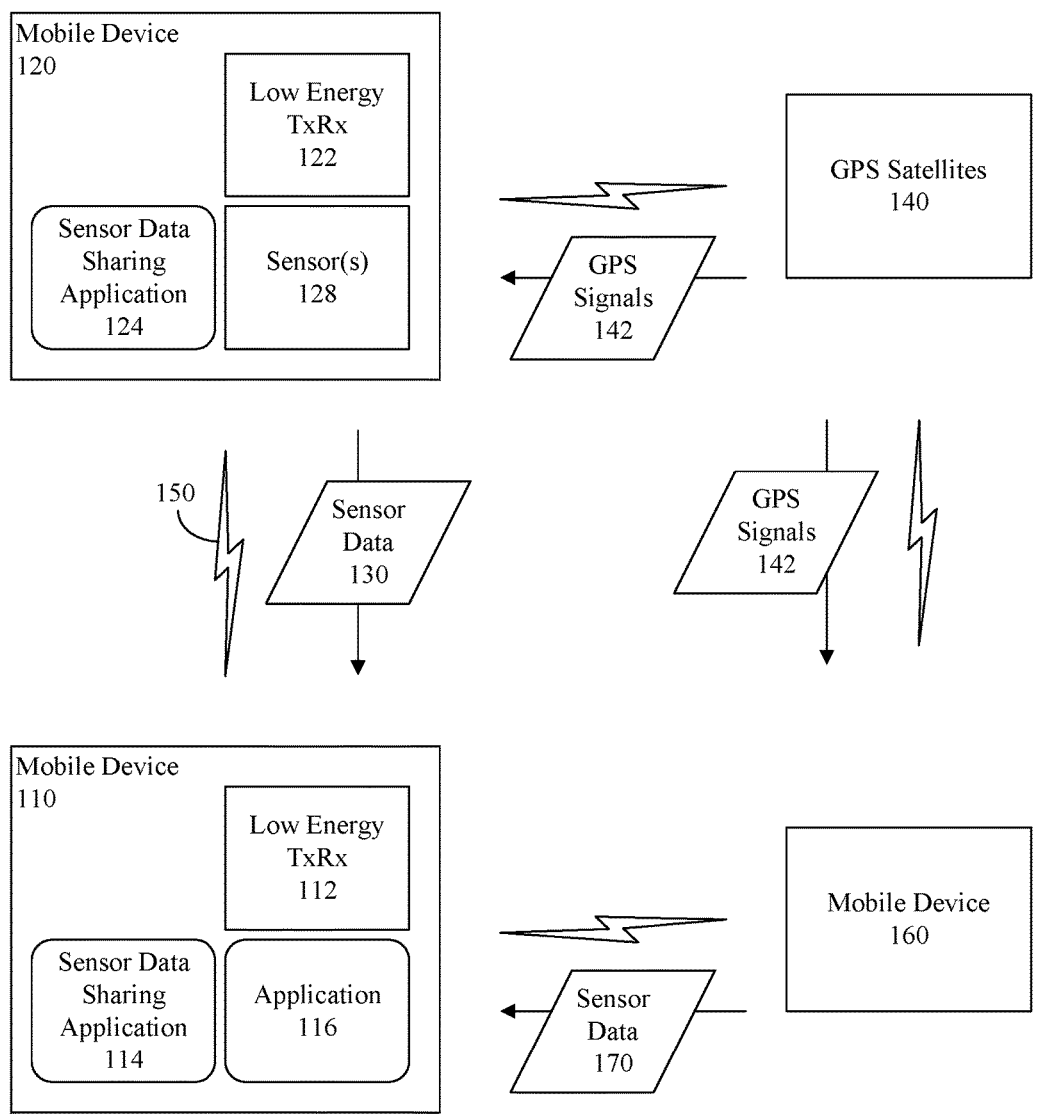
FIG. 1 is a block diagram illustrating an example of a mobile computing environment.

The present invention relates to mobile devices, and more specifically, to use of location data.

In accordance with the inventive arrangements disclosed herein, a first mobile device can receive sensor data from at least a second mobile device. For example, the first mobile device can receive the sensor data via a low energy communication link, such as a near field communication (NFC) link or a Bluetooth® low energy (BLE) communication link, which is a type of a short-range wireless connection. The first mobile device can provide the sensor data to an application executed on the first mobile device that provides a service that uses the sensor data.

In illustration, the first mobile device may not include a global positioning satellite (GPS) receiver, or the GPS receiver may be inoperable, but an application executing on the first mobile device may use GPS location data in order to provide a location based service which the application is configured to provide. To enable such service to be provided, the first mobile device can receive the GPS location data from the second mobile device, and provide to the application that GPS location data. Accordingly, the user of the first mobile device can benefit from use of the application, even though the first mobile device does not include a GPS receiver normally used by the application to provide the location based service.

Several definitions that apply throughout this document now will be presented.

As defined herein, the term "mobile device" means a wireless processing device including at least one processor, memory elements, and at least one transceiver (or transmitter/receiver pair) configured to wirelessly communicate data. Examples of a mobile device include, but are not limited to, a mobile computer, a laptop computer, a netbook computer, a tablet computer, a smartphone, a digital personal assistant, a smart watch, smart glasses, a mobile gaming device, and the like.

As defined herein, the term "sensor" means a device that senses absolute value or a change in a value or quantity and generates a corresponding signal or data. A sensor can be, for example, a physical sensor, a software sensor, or a combination of a physical sensor and a software sensor. Examples of a sensor include, but are not limited to, a GPS receiver that generates location data, an accelerometer that generates acceleration data, a thermometer that generates temperature data, and the like.

As defined herein, the term "virtual sensor" means a data structure that receives sensor data generated by one or more sensors (e.g., physical sensors and/or software sensors), and provides a corresponding output.

As defined herein, the term "sensor data" means data generated by a sensor.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

FIG. 1 is a block diagram illustrating an example of a mobile computing environment 100. The mobile computing environment 100 can include a mobile device 110 and a mobile device 120. In one non-limiting arrangement, the mobile computing environment 100 can include one or more GPS satellites 140 that generate GPS signals 142 used by GPS receivers to generate location data, as is well known in the art.

Each of the mobile devices 110, 120 can include a respective low energy transceiver (hereinafter "transceiver") 112, 122, for example NFC transceivers or BLE transceivers. Further, each of the mobile devices 110, 120 can include a respective sensor data sharing application 114, 124. The sensor data sharing applications 114, 124 can be executed by processors of the respective mobile devices 110, 120 to implement sharing of sensor data, as will be described. Further, the mobile device 110 can include an application 116 that consumes sensor data 130, and the mobile device 120 can include one or more sensors 128 that generate sensor data 130. In one non-limiting arrangement, a sensor 128 can be a GPS receiver that receives the GPS signals 142 and generates corresponding GPS location data as the sensor data 130. Other examples of the sensors 128 include, but are not limited to, an accelerometer, a thermometer, and the like. The mobile device 110 may, or may not, include a sensor (not shown) that generates the same type of sensor data as the sensor 128. For instance, the mobile device 110 may include such a sensor, but such a sensor may be inoperable, or may be turned off to conserve power on the mobile device 110.

In operation, the mobile devices 110, 120 can establish a low energy communication link (hereinafter "communication link") 150 between the mobile devices 110, 120 using the transceivers 112, 122. The communication link 150 can be established using techniques known in the art. For example, the mobile device 110 can transmit a signal using the transceiver 112 to initiate a pairing with one or more other mobile devices. When the mobile device 120 is within range of the signal, the transceiver 122 can detect the signal, and the mobile device 120 can exchange signals with the mobile device 110 to complete the paring process. In the case that the transceivers 112, 122 are NFC transceivers, the mobile device 120 can be within range of the mobile device 110 when the mobile device 120 is located within approximately 20 cm of the mobile device 110. In the case that the transceivers 112, 122 are BLE transceivers, the mobile device 120 can be within range of the mobile device 110 when the mobile device 120 is located within approximately 50 m of the mobile device 110.

In one arrangement, the sensor data sharing application 114 can initiate the pairing of the mobile device 110 with one or more other mobile devices, such as the mobile device 120. For example, the application 116 can be configured to provide a service that uses a particular type of sensor data, and the application can be executed by the mobile device 110. Responsive to the sensor data sharing application 114 detecting that the application 116 is attempting to access the particular type of sensor data from the mobile device 110, and determining that the particular type of sensor data is not presently available on the mobile device 110, the sensor data sharing application 114 can initiate the pairing of the mobile device 110 with one or more other mobile devices.

Responsive to the pairing process between the mobile device 110 and the mobile device 120 being completed to establish the communication link 150, the sensor data sharing application 114 can communicate a request to the mobile device, via the communication link 150, requesting sensor data that is the particular type of sensor data the application 116 is attempting to access. The sensor data sharing application 124 can detect the request being received by the mobile device 120. The sensor data sharing application 124 can determine whether the mobile device 120 includes a sensor 128 configured to generate the particular type of sensor data. If so, the sensor data sharing application 124 can communicate sensor data 130 generated by that sensor 128 to the mobile device 110 via the communication link 150. If the sensor 128 is not presently active when the request from the mobile device 110 is received, the sensor data sharing application 124 can activate the sensor 128 to begin generating the sensor data 130. In this regard, the mobile device 120 can dynamically provide the sensor data 130 to the mobile device 110.

In one aspect of the present arrangements, the sensor data sharing application 124 can determine whether to share the sensor data 130 with the mobile device 110 based on one or more policies established for the mobile device 110. Such policies can be user defined policies, or default policies. In illustration, the request received from the mobile device 110 can indicate an identifier of the mobile device 110, for example a media access control address (MAC address) of the mobile device 110 or a user identifier of a user using (e.g., logged into) the mobile device 110. In another arrangement, the sensor data sharing application 114 can communicate the identifier to the mobile device 120 during the pairing process between the mobile device 110 and the mobile device 120.

If the policies indicate that the mobile device 110 is a trusted mobile device, or the user of the mobile device 110 is a trusted user, then the sensor data sharing application 124 can initiate processes on the mobile device 120 to share the sensor data 130 with the mobile device 110. If the policies do not indicate that the mobile device 110 is a trusted mobile device, or the user of the mobile device 110 is a trusted user, then the sensor data sharing application 124 can ignore the request, or respond to the request by communicating a notification to the mobile device 110. The notification can be presented by the mobile device 110 to the user of the mobile device 110. The notification can indicate that the sensor data 130 is not available and/or indicate that the mobile device 110 and/or user of the mobile device 110 needs to be added to the policies of the mobile device 120 as a trusted mobile device 110/user. In another arrangement, the notification can prompt the user of the mobile device 120 to indicate whether the user still chooses to share the sensor data 130 with the mobile device 110. If the user chooses to do so, then the sensor data sharing application 124 can initiate processes on the mobile device 120 to share the sensor data 130 with the mobile device 110.

In another arrangement, trust between the mobile device 110 and the mobile device 120 can be established based on one or more authentication certificates. For example, the sensor data sharing application 114 can include an authentication certificate in the request sent by the mobile device 110 to the mobile device 120 requesting the sensor data 130. In another arrangement, the sensor data sharing application 1140 can communicate the authentication certificate to the mobile device 120 during the pairing process between the mobile device 110 and the mobile device 120. The sensor data sharing application 124 can process the authentication certificate to determine whether the mobile device 110 is a trusted mobile device, or the user of the mobile device 110 is a trusted user. Again, if the sensor data sharing application 124 determines that the mobile device 110 is a trusted mobile device, or the user of the mobile device 110 is a trusted user, then the sensor data sharing application 124 can initiate processes on the mobile device 120 to share the sensor data 130 with the mobile device 110. If the sensor data sharing application 124 determines that the mobile device 110 is not a trusted mobile device, or the user of the mobile device 110 is not a trusted user, then the sensor data sharing application 124 can ignore the request, respond to the request by communicating a notification to the mobile device 110, or prompt the user of the mobile device 120 to indicate whether the user still chooses to share the sensor data 130 with the mobile device 110, as previously described. As noted, if the user chooses to still share the sensor data 130, the sensor data sharing application 124 can initiate processes on the mobile device 120 to share the sensor data 130 with the mobile device 110.

Responsive to the mobile device 110 receiving the sensor data 130 from the mobile device 120 via the communication link 150, the mobile device 110 can execute program code configured to provide the particular type of sensor data to the application 116, and provide the sensor data 130 to the application 116 accordingly. For example, the sensor data sharing application 114 can initiate execution of the program code, which may be a component of the sensor data sharing application 114. In one arrangement, the program code can define a virtual sensor that is configured to provide the particular type of sensor data the application 116 is attempting to access. The mobile device 110 can execute the program code to initialize the virtual sensor. The virtual sensor can receive the sensor data 130 from the mobile device 120 and provide the sensor data 130 to the application 116. Thus, the application 116 can process the sensor data 130 as though the sensor data 130 were generated by a sensor of the mobile device 110.

In one arrangement, prior to providing the sensor data 130 to the application 116, the sensor data sharing application 114 can validate the sensor data 130. For example, the sensor data sharing application 114 can process the sensor data 130 to determine whether the sensor data 130 is the particular type of sensor data the application 116 is attempting to access. If the sensor data 130 is the particular type of sensor data the application 116 is attempting to access, the sensor data sharing application 114 can provide the sensor data 130 to the application 116.

Optionally, the sensor data sharing application 124 can communicate to the mobile device 110 an authentication certificate for the mobile device 120, or a user of the mobile device 120. The sensor data sharing application 124 can communicate the authentication certificate during the pairing process between the mobile device 110 and the mobile device 120, or communicate the authentication certificate to the mobile device 110 sometime later. For example, the sensor data sharing application 124 can communicate the authentication certificate with the sensor data 130. The sensor data sharing application 114 can process the authentication certificate to authenticate the mobile device 120 or a user of the mobile device 120. If the sensor data sharing application 114 is able to authenticate mobile device 120 or the user of the mobile device 120, then the sensor data sharing application 114 can provide the sensor data 130 to the application 116. If, however, the sensor data sharing application 114 is not able to authenticate mobile device 120 or the user of the mobile device 120, then the sensor data sharing application 114 need not provide the sensor data 130 to the application 116. In such case, the sensor data sharing application 114 can present a notification to the user of the mobile device 110 indicating that the mobile device 120, or user of the mobile device 120, is not authenticated. Further, the sensor data sharing application 114 can prompt the user of the mobile device 110 to enter a user input into the mobile device 110 to indicate whether the user chooses to still access the sensor data 130. If the user chooses to do so, then the sensor data sharing application 114 can provide the sensor data 130 to the application 116.

In one aspect of the present arrangements, the sensor data sharing application 114 can specify a frequency (e.g., a number of times per second, minute, hour, etc.) at which the sensor data 130 is to be communicated from the mobile device 120 to the mobile device 110. The sensor data sharing application 114 can specify the frequency based on user defined policies or default policies. In illustration, when communicating the request to the mobile device 120 for the sensor data 130, the sensor data sharing application 114 can specify in the request the frequency at which the sensor data 130 is to be communicated from the mobile device 120 to the mobile device 110. The sensor data sharing application 124 can identify such specification in the request, and communicate the sensor data 130 at the specified frequency. Moreover, the sensor data sharing application 114 can change the frequency from time to time by communicating supplemental requests to the mobile device 120. Thus, the sensor data sharing application 114 can regulate the power consumption of the mobile device 110 used to receive and process the sensor data 130. In illustration, if the level of charge available on the battery of the mobile device 110 drops below a threshold value, the sensor data sharing application 114 can communicate an updated request to the mobile device 120, thus conserving power on the mobile devices 110, as well as the mobile device 120.

In a similar manner, if the level of charge available on the battery of the mobile device 120 drops below a threshold value, the sensor data sharing application 124 can reduce the frequency at which the mobile device 120 communicates the sensor data 130 to the mobile device 110, thus conserving power. Responsive to determining that the frequency of communicating the sensor data 130 will be changed, the sensor data sharing application 124 can communicate a message to the mobile device 110 via the communication link 150 to alert the mobile device 110 of the change in the frequency of sensor data 130 delivery.

In one aspect of the present arrangements, the mobile computing environment 100 can include one or more additional mobile devices, such as a mobile device 160. The mobile device 160 also can include one or more respective sensors (not shown), a respective sensor data sharing application (not shown), and a respective low energy transceiver (not shown). In such an arrangement, the mobile device 110 is not limited to receiving sensor data from only one mobile device. For example, in addition to receiving the sensor data 130 from the mobile device 120, the mobile device 110 also can receive sensor data 170 from the mobile device 160.

In such an arrangement, the sensor data sharing application 114 can provide to the application 116 the sensor data 130, the sensor data 170, or sensor data derived by processing the sensor data 130 and sensor data 170. In one example, the sensor data sharing application 114 can compare the sensor data 130 to the sensor data 170 to determine which sensor data 130, 170 has a highest fidelity (e.g., appears to be most accurate, communicated at a frequency most closely matching a desired frequency of delivery, etc.), and select the sensor data 130, 170 that has the highest fidelity to provide to the application 116. In illustration, if the sensor data 130 and the sensor data 170 both can be GPS location data. The sensor data sharing application 114 can determine which sensor data 130, 170 is most stable (e.g., having the smallest variations between measurements) or is available to be communicated at a desired frequency. If the sensor data 170 is more stable than the sensor data 130, or can be delivered at a desired frequency whereas the sensor data 130 cannot be delivered at the desired frequency, the sensor data sharing application 114 can provide the sensor data 170 to the application 116.

In another example, the sensor data sharing application 114 can process the sensor data 130 and the sensor data 170 to normalize the sensor data 130, 170 for a location midway between the mobile devices 120, 160, and generate normalized sensor data to the application 116. In an example in which the mobile device receives the sensor data 130, 170, as well as sensor data (not shown) from one or more additional mobile devices (not shown), the sensor data sharing application 114 can normalize the sensor data 130, 170 and the other sensor data to generate normalized sensor data by performing multi-lateration (e.g., trilateration) on the sensor data 130, 170 and the other sensor data. Again, the sensor data sharing application 114 can provide the normalized sensor data to the application 116.

Further, the burden of power consumption for providing the sensor data 130, 170 can be automatically shared among multiple mobile devices 120, 160. For example, the mobile device 160 can establish a low energy communication link with the mobile device 120, for example as previously described. In this example assume that, initially, neither the mobile device 120 nor the mobile device 160 are plugged into a power outlet and, instead, are operating on battery power. The sensor data sharing application 114 can communicate to the mobile devices 120, 160 requests indicating when the respective mobile devices 120, 160 are two communicate the respective sensor data 130, 170. For example, the sensor data sharing application 114 can specify that the mobile device 120 provide the sensor data 130 at specific intervals (e.g., at minutes 1, 3, 5, 7, etc. of an hour), and specify that the mobile device 160 provide the sensor data 170 at intervening intervals (e.g., at minutes 2, 4, 6, 8, etc. of the hour). Such an arrangement can conserve power on the mobile devices 120, 160.

Responsive to the sensor data sharing application 124 detecting the mobile device 120 being plugged into a power outlet, the sensor data sharing application 124 can communicate a message to the mobile devices 110, 160, over the respective communication links, indicating that the mobile device 120 will assume responsibility for communicating the sensor data 130 to the mobile device 110. Responsive to receiving such message, the mobile device 160 can cease communicating the sensor data 170 to the mobile device 110, thus conserving energy on the mobile device 160. With the mobile device 110 also having received the message, the sensor data sharing application 114 can cease monitoring for the sensor data 170 from the mobile device 160. Moreover, the sensor data sharing application 114 can send an update request to the mobile device 120 to change the frequency at which the mobile device 120 communicates the sensor data 130. For example, the sensor data sharing application 114 can request that the mobile device 120 begin communicating the sensor data 130 every minute. If the mobile device 120 becomes unplugged from the power outlet, the sensor data sharing application 124 can communicate corresponding messages to the mobile devices 110, 160 to initiate the mobile device 160 to again begin sending the sensor data 170 at specific intervals.

At this point, consideration of the following use case is beneficial. In the use case, assume there are multiple students with smartphones in a school, and the number of smartphones far exceeds the number of publically available power outlets (e.g., charging stations). Many of the smartphones can execute GPS tracking applications for various purposes, for example to allow friends and family to be aware of respective user locations. The school campus may be large enough that the respective sensor data sharing applications continue to sample and communicate sensor data. This can drain the respective smartphone batteries. In accordance with the previously described arrangements, those smartphones that are plugged into power outlets can assume responsibility for communicating sensor data to other smartphones, while those smartphones that are not plugged into power outlets need not do so. As various smartphones are unplugged from the power outlets and plugged into the power outlets, the responsibility of providing the sensor data can shift from those smartphones that are unplugged to the smartphones that are plugged in. This can help to conserve battery life on the smartphones that are unplugged.

FIG. 2 is a flow chart illustrating an example of a method 200 of first mobile device using sensor data received from a second mobile device. At step 205, a first mobile device can execute an application configured to provide a service using a particular type of sensor data. At step 210, the application attempting to access the particular type of sensor data from the first mobile device can be detected. At step 215, responsive to detecting the application attempting to access the particular type of sensor data from the first mobile device, the first mobile device can receive first sensor data from at least a second mobile device via at least a first low energy communication link, wherein the first sensor data received from the second mobile device is the particular type of sensor data the application is attempting to access. Further, program code configured to provide the particular type of sensor data can be executed by the first mobile device, and the first mobile device can provide the first sensor data received from the second mobile device to the application.

Figure 3:
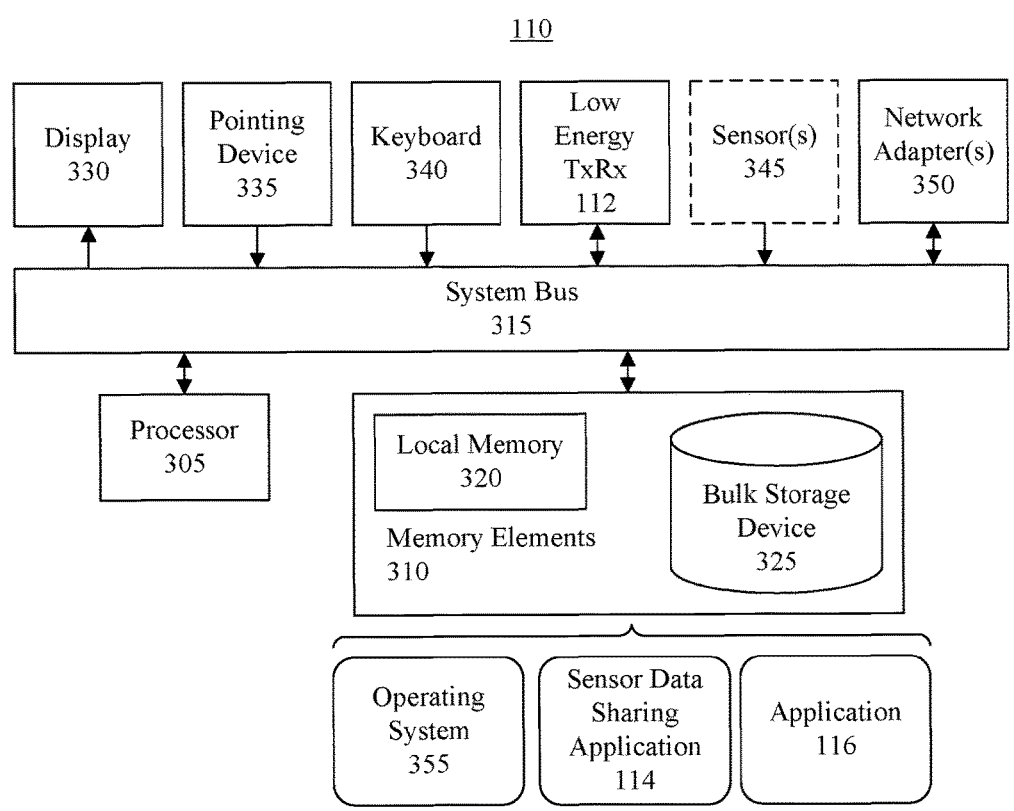
FIG. 3 is a block diagram illustrating example architecture for a mobile device.

FIG. 3 is a block diagram illustrating an example architecture for the mobile device 110. The mobile devices 120, 160 can use a similar architecture.

The mobile device 110 can include at least one processor 305 (e.g., a central processing unit) coupled to memory elements 310 through a system bus 315 or other suitable circuitry. As such, the mobile device 110 can store program code within the memory elements 310. The processor 305 can execute the program code accessed from the memory elements 310 via the system bus 315. It should be appreciated that the mobile device 110 can be implemented in the form of any system including a processor and memory that is capable of performing the functions and/or operations described within this specification.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The mobile device 110 also can include one or more cache memories (not shown) that provide temporary storage of at least some program code in order to reduce the number of times program code must be retrieved from the bulk storage device 325 during execution.

Input/output (I/O) devices such as a display (or touch-screen) 330 and, optionally, a pointing device 335 and a keyboard 340 can be coupled to the mobile device 110. The I/O devices also can include the low energy transceiver 112 and, optionally, one or more sensors 345. The I/O devices can be coupled to the mobile device 110 either directly or through intervening I/O controllers. For example, the display 330 can be coupled to the mobile device 110 via a graphics processing unit (GPU), which may be a component of the processor 305 or a discrete device. One or more network adapters 350 also can be coupled to mobile device 110 to enable the mobile device 110 to become coupled to other systems, computer systems, remote printers, and/or remote storage devices through intervening private or public networks. Modems, cable modems, transceivers, and Ethernet cards are examples of different types of network adapters 350 that can be used with the mobile device 110.

As pictured in FIG. 3, the memory elements 310 can store the components of the mobile device 110 of FIGS. 1 and 3, namely the an operating system 355, the sensor data sharing application 114 and the application 116 that uses sensor data. Being implemented in the form of executable program code, these components of the mobile device 110 can be executed by the mobile device 110 and, as such, can be considered part of the mobile device 110. Moreover, the operating system 355, sensor data sharing application 114 and application 116 are functional data structures that impart functionality when employed as part of the mobile device 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   executing, by a first mobile device, an application configured to provide a service using a particular type of sensor data;
   detecting the application attempting to access the particular type of sensor data from the first mobile device; and
   responsive to detecting the application attempting to access the particular type of sensor data from the first mobile device and determining that the particular type of sensor data is not presently available on the first mobile device:
      initiating pairing of the first mobile device with at least a second mobile device via at least a first low energy communication link;
      receiving, by the first mobile device, first sensor data from at least the second mobile device via at least the first low energy communication link, wherein the first sensor data received from the second mobile device is the particular type of sensor data the application is attempting to access; and
      executing, by the first mobile device, program code configured to provide the particular type of sensor data, and providing the first sensor data received from the second mobile device to the application;
   receiving a message from a third mobile device generated by the third mobile device responsive to the third mobile device detecting the third mobile device being plugged into a power outlet, the message indicating the third mobile device will assume responsibility for communicating sensor data to the first mobile device;
   responsive to receiving the message from the third mobile device indicating the third mobile device will assume responsibility for communicating sensor data to the first mobile device:
      receiving, by the first mobile device, second sensor data from the third mobile device via at least a second low energy communication link, wherein the second sensor data received from the third mobile device is the particular type of sensor data the application is attempting to access; and
      providing the second sensor data received from the third mobile device to the application.

2. The method of claim 1, wherein the first low energy communication link is a near field communication link or a short-range wireless connection.

3. The method of claim 1, further comprising:
   comparing a first fidelity of the first sensor data received from the second mobile device to a second fidelity of the second sensor data received from the third mobile device; and
   based on the comparing, determining whether the second fidelity of the second sensor data is higher than the first fidelity of the first sensor data, wherein the second fidelity of the second sensor data is higher than the first fidelity of the first sensor data if the second sensor data is communicated at a frequency most closely matching a desired frequency of delivery of the sensor data;

wherein providing the second sensor data received from the third mobile device to the application further is responsive to determining that the second fidelity of the second sensor data is higher than the first fidelity of the first sensor data.

4. The method of claim 1, further comprising:
normalizing the first sensor data and the second sensor data to generate normalized sensor data;
wherein providing the first sensor data received from the second mobile device to the application and providing the second sensor data received from the third mobile device to the application comprises:
providing the normalized sensor data to the application.

5. The method of claim 1, wherein the first sensor data is global positioning system location data.

6. A first mobile device, system comprising a first mobile device and at least a third mobile device, the system configured to initiate executable operations comprising:
executing, by the first mobile device, an application configured to provide a service using a particular type of sensor data;
detecting the application attempting to access the particular type of sensor data from the first mobile device; and
responsive to detecting the application attempting to access the particular type of sensor data from the first mobile device and determining that the particular type of sensor data is not presently available on the first mobile device:
initiating pairing of the first mobile device with at least a second mobile device via at least a first low energy communication link;
receiving, by the first mobile device, first sensor data from at least the second mobile device via at least the first low energy communication link, wherein the first sensor data received from the second mobile device is the particular type of sensor data the application is attempting to access; and
executing, by the first mobile device, program code configured to provide the particular type of sensor data, and providing the first sensor data received from the second mobile device to the application;
responsive to the third mobile device detecting the third mobile device being plugged into a power outlet, generating, by the third mobile device, a message indicating the third mobile device will assume responsibility for communicating sensor data to the first mobile device;
receiving, by the first mobile device, the message from the third mobile device indicating the third mobile device will assume responsibility for communicating sensor data to the first mobile device;
responsive to receiving the message from the third mobile device indicating the third mobile device will assume responsibility for communicating sensor data to the first mobile device:
receiving, by the first mobile device, second sensor data from the third mobile device via at least a second low energy communication link, wherein the second sensor data received from the third mobile device is the particular type of sensor data the application is attempting to access; and
providing the second sensor data received from the third mobile device to the application.

7. The system of claim 6, wherein the first low energy communication link is a near field communication link or a short-range wireless connection.

8. The system of claim 6, the executable operations further comprising:
comparing a first fidelity of the first sensor data received from the second mobile device to a second fidelity of the second sensor data received from the third mobile device; and
based on the comparing, determining whether the second fidelity of the second sensor data is higher than the first fidelity of the first sensor data, wherein the second fidelity of the second sensor data is higher than the first fidelity of the first sensor data if the second sensor data is communicated at a frequency most closely matching a desired frequency of delivery of the sensor data;
wherein providing the second sensor data received from the third mobile device to the application is further responsive to determining that the second fidelity of the second sensor data is higher than the first fidelity of the first sensor data.

9. The system of claim 6, the executable operations further comprising:
normalizing the first sensor data and the second sensor data to generate normalized sensor data;
wherein providing the first sensor data received from the second mobile device to the application and providing the second sensor data received from the third mobile device to the application comprises:
providing the normalized sensor data to the application.

10. The system of claim 6, wherein the first sensor data is global positioning system location data.

11. A computer program product comprising a computer readable storage medium having program code stored thereon, the program code executable by a processor to perform a method comprising:
executing, by a first mobile device using the processor, an application configured to provide a service using a particular type of sensor data;
detecting, by the first mobile device, the application attempting to access the particular type of sensor data from the first mobile device; and
responsive to detecting the application attempting to access the particular type of sensor data from the first mobile device and determining that the particular type of sensor data is not presently available on the first mobile device:
initiating, by the first mobile device, pairing of the first mobile device with at least a second mobile device via at least a first low energy communication link;
receiving, by the first mobile device, first sensor data from at least the second mobile device via at least the first low energy communication link, wherein the first sensor data received from the second mobile device is the particular type of sensor data the application is attempting to access; and
executing, by the first mobile device, program code configured to provide the particular type of sensor data, and providing the first sensor data received from the second mobile device to the application;
receiving, by the first mobile device, a message from a third mobile device generated by the third mobile device responsive to the third mobile device detecting the third mobile device being plugged into a power outlet, the message indicating the third mobile device will assume responsibility for communicating sensor data to the first mobile device;

responsive to receiving the message from the third mobile device indicating the third mobile device will assume responsibility for communicating sensor data to the first mobile device:
  receiving, by the first mobile device, second sensor data from the third mobile device via at least a second low energy communication link, wherein the second sensor data received from the third mobile device is the particular type of sensor data the application is attempting to access; and
  providing, by the first mobile device, the second sensor data received from the third mobile device to the application.

12. The computer program product of claim 11, wherein the first low energy communication link is a near field communication link or a short-range wireless connection.

13. The computer program product of claim 11, the method further comprising:
  comparing a first fidelity of the first sensor data received from the second mobile device to a second fidelity of the second sensor data received from the third mobile device; and
  based on the comparing, determining whether the second fidelity of the second sensor data is higher than the first fidelity of the first sensor data, wherein the second fidelity of the second sensor data is higher than the first fidelity of the first sensor data if the second sensor data is communicated at a frequency most closely matching a desired frequency of delivery of the sensor data;
  wherein providing the second sensor data received from the third mobile device to the application is further responsive to determining that the second fidelity of the second sensor data is higher than the first fidelity of the first sensor data.

14. The computer program product of claim 11, the method further comprising:
  normalizing the first sensor data and the second sensor data to generate normalized sensor data;
  wherein providing the first sensor data received from the second mobile device to the application and providing the second sensor data received from the third mobile device to the application comprises:
    providing the normalized sensor data to the application.

15. The computer program product of claim 11, wherein the first sensor data is global positioning system location data.

* * * * *